US008788805B2

(12) United States Patent
Herne et al.

(10) Patent No.: US 8,788,805 B2
(45) Date of Patent: Jul. 22, 2014

(54) APPLICATION-LEVEL SERVICE ACCESS TO ENCRYPTED DATA STREAMS

(75) Inventors: Michael Herne, Saratoga, CA (US); David McGrew, Poolesville, MD (US)

(73) Assignee: Cisco Technology, Inc., San Jose, CA (US)

(*) Notice: Subject to any disclaimer, the term of this patent is extended or adjusted under 35 U.S.C. 154(b) by 1541 days.

(21) Appl. No.: 12/040,050

(22) Filed: Feb. 29, 2008

(65) Prior Publication Data
US 2009/0220080 A1 Sep. 3, 2009

(51) Int. Cl.
*H04L 29/06* (2006.01)
*H04L 9/08* (2006.01)
*G06F 21/60* (2013.01)

(52) U.S. Cl.
CPC ............ *H04L 63/062* (2013.01); *H04L 9/0827* (2013.01); *H04L 63/029* (2013.01); *H04L 63/1425* (2013.01); *G06F 21/606* (2013.01)
USPC ........................................................ 713/153

(58) Field of Classification Search
CPC . H04L 9/0819–9/0836; H04L 9/0838–9/0847; H04L 29/06557–29/06625; H04L 63/06–63/08; H04L 63/14–63/1425
USPC ........................................................ 713/153
See application file for complete search history.

(56) References Cited

U.S. PATENT DOCUMENTS 7,055,027 B1* 5/2006 Gunter et al. ................. 713/151
7,120,666 B2* 10/2006 McCanne et al. ............ 709/203
2004/0059685 A1* 3/2004 Sakamura et al. ............ 705/65
2004/0235563 A1* 11/2004 Blackburn et al. ............ 463/29
2004/0268149 A1* 12/2004 Aaron ........................... 713/201
2009/0025078 A1* 1/2009 Kuehr-McLaren et al. .... 726/14

OTHER PUBLICATIONS

Blue Coat. Blue Coat Web Filter Overview. Published by Blue Coat Systems [online], Inc. 2007. [retrieved on Sep. 25, 2008]. pp. 1-2. Retrieved from the Internet: <URL: http://www.bluecoat.com/doc/direct/789>. USA.
Wireshark. Linux cooked-mode capture (SSL). Published by the Wireshark Wiki [online]. Apr. 2008 [retrieved on Sep. 25, 2008]. pp. 1-2. Retrieved from the Internet: <URL: http://wiki.wireshark.org/SLL>.

(Continued)

*Primary Examiner* — Linglan Edwards
*Assistant Examiner* — Kevin Bechtel
(74) *Attorney, Agent, or Firm* — Hickman Palermo Truong Becker Bingham Wong LLP

(57) ABSTRACT

Techniques for securely providing cryptographic keys to trusted intermediate nodes or monitoring devices are described so that SSL, TLS, or IPSec communications can be monitored, compressed over a WAN, or otherwise used. In an embodiment, a trusted intermediate node establishes a secure connection to a key server; receiving session identification data for an encrypted session between a client and a content server during negotiation of the encrypted session, and storing a copy of the session identification data; requesting from the key server, over the secure connection, a decryption key associated with the encrypted session; receiving an encrypted message communicated between the client and the content server; forwarding the encrypted message without modification to a destination address in the encrypted message; and decrypting the encrypted message using the decryption key to result in decrypted data and using or storing the decrypted data in a storage unit.

30 Claims, 8 Drawing Sheets

(56) References Cited

OTHER PUBLICATIONS

McAfee. Encrypted Threat Protection: Network IPS for SSL Encrypted Traffic. Published by McAfee Network Protection Solutions [online]. Feb. 2005 [retrieved on Sep. 25, 2008]. pp. 1-7. Retrieved from the Internet: <URL: http://www.mcafee.com/us/local_content/white_papers/wp_encr_th_prot.pdf>.Santa Clara, California, USA.

Transport Layer Security. Wikipedia, the free encyclopedia. [retrieved on Sep. 25, 2008]. Retrieved from the Internet: <URL: http://en.wikipedia.org/wiki/Transport_layer_security>.

Wagner, D., et al. Analysis of the SSL 3.0 Protocol. Published by the Second USENIX Workshop on Electronic Commerce Proceedings [online]. Nov. 1996 [retrieved on Sep. 25, 2008]. Retrieved from the Internet: <URL: http://www.schneier.com/paper-ssl.pdf>. pp. 1-12. Berkeley, California, USA.

Tuecke, S., et al. Internet X.509 Public Key Infrastructure (PKI) Proxy Certificate Profile. Published by the Internet Society [online]. 2004 [retrieved on Sep. 25, 2008]. Retrieved from the Internet: <URL: http://www.ietf.org/rfc/rfc3820.txtf>. pp. 1-35.

Webtrust. Webtrust Overview of Trust Services. Published by Webtrust [online]. 2007 [retrieved on Sep. 25, 2008]. pp. 1-3. Retrieved from the Internet: <URL: http://www.webtrust.org/index.cfm/ci_id/43989/la_id/1.htm>. West Toronto, Ontario, Canada.

Cabforum. Extended Validation SSL Certificates. Published by Cabforum [online]. 2008 [retrieved on Sep. 25, 2008]. pp. 1-3. Retrieved from the Internet: <URL: http://www.cabforum.org/>.

Bellare, M., et al. Message Authentication Using Hash Functions—The HMAC Construction. Published by RSA Laboratories' CryptoBytes [online], vol. 2, No. 1, Spring 1996 [retrieved on Sep. 25, 2008]. Retrieved from the Internet: <URL: http://www-cse.ucsd.edu/~mihir/papers/hmac-cb.pdf>.

* cited by examiner

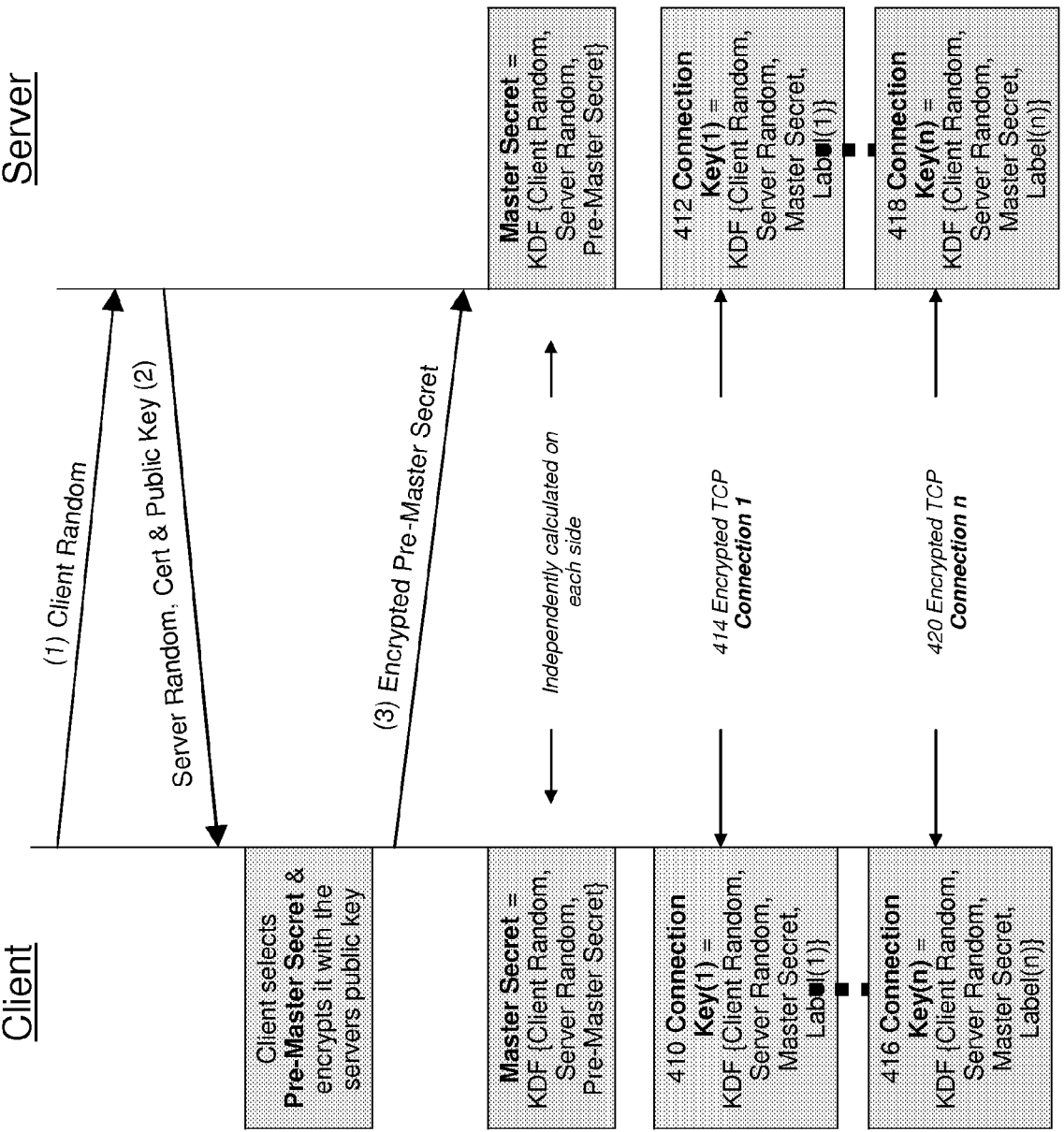

APPLICATION-LEVEL SERVICE ACCESS TO ENCRYPTED DATA STREAMS

TECHNICAL FIELD

The present disclosure generally relates to processing encrypted application-level messages in a network node such as a router or switch.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Data communication networks use services such as compression, latency reduction, intrusion prevention, data leakage, and firewalls. These services are required to act directly on the traffic that passes through them. Technical advances are resulting in services that have greater awareness of information represented in a message at the application layer of the OSI network reference model, or represented in a message payload, as compared to the network packet level. However, these services cannot inspect or modify information at the application level when the information is encrypted. This problem occurs for any encrypted stream or tunnel traversing one of these services.

Examples of cryptographic protocols that create this problem include SSL/TLS and IPsec. While these cryptographic protocols can provide a secure cryptographic connection between two devices, so that the secure channel is unintelligible to all other devices, there are situations in which it is desirable to allow other devices to listen in on a particular cryptographic connection. In many cases there is a need to monitor traffic for conformance to a security policy. Another situation is the need to debug a particular implementation using an external application such as tcpdump. The former case is especially important for network firewalls, which in some instances cannot perform their monitoring functions in the presence of encrypted traffic. Additionally, some firewall functions such as telephony require access to signaling traffic in order to work at all.

BRIEF DESCRIPTION OF THE DRAWINGS

In the drawings:

FIG. 4B illustrates a client and server determining connection keys for encrypted connections.

DETAILED DESCRIPTION

Figure 1:
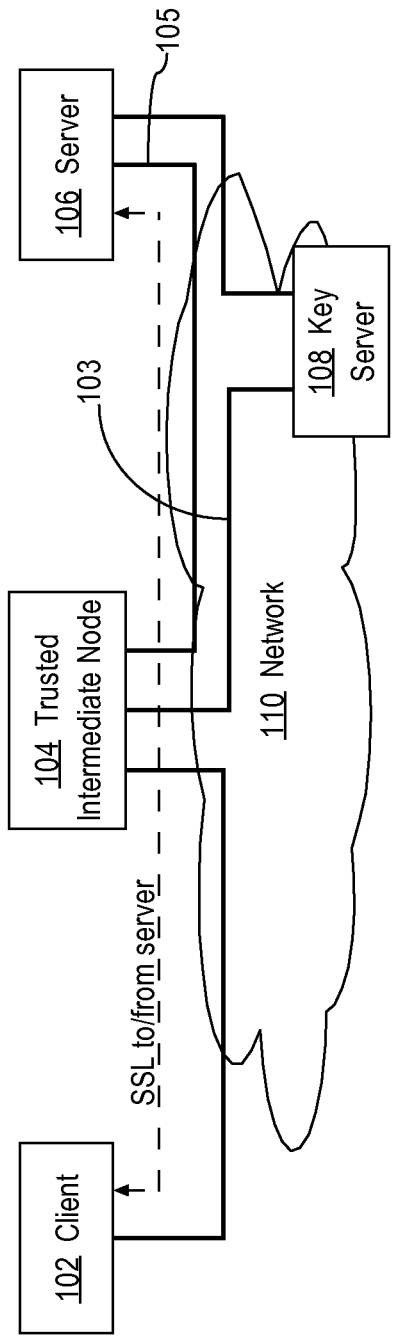
FIG. 1 illustrates a networked system of a client, trusted intermediate node, server, and key server.

Application-level service access to encrypted data streams is now described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
 1.0 General Overview
 2.0 Structural and Functional Overview
  2.1 Secure Sockets Layer-Background
  2.2 Trusted Intermediary Node Services
  2.3 Benefits of Certain Embodiments
 3.0 Secure Key Share Transport for Monitoring IPsec Connections
 4.0 Implementation Mechanisms—Hardware Overview
 5.0 Extensions and Alternatives 1.0 GENERAL OVERVIEW The following acronyms have the following meanings:
OSI: Open Systems Interconnection
SSL: Secure Sockets Layer
TSL: Transport Layer Security
HMAC: Hash-based Message Authentication Code
LAN: Local Area Network
HTTPS: Hypertext Transfer Protocol Secure
IV: Initialization Vector
DSS: Digital Signature Standards
RSA: Rivest, Shamir, and Adelman
ANSI: American National Standards Institute
IEEE: Institute of Electrical and Electronic Engineers
ESP: Encapsulating Security Payload
SA: Security Associations
NAT: Network Address Translation
PAT: Port Address Translation
STUN: Simple Traversal of UDP through NAT
UDP: User Diagram Protocol
CD-ROM: Compact Disc-Read Only Memory
RAM: Random Access Memory
RROM: Programmable Read Only Memory
EPROM: Erasable Programmable Read Only Memory Techniques for securely providing cryptographic keys to trusted intermediate nodes or monitoring devices are described so that SSL, TLS, or IPSec communications can be monitored, compressed over a WAN, or otherwise used. In an embodiment, a trusted intermediate node comprises logic that is configured to establish a secure connection to a key server; receive or capture session identification data for an encrypted session between a client and a content server during negotiation of the encrypted session, and store a copy of the session identification data; request from the key server, over the secure connection, a decryption key associated with the encrypted session; receive or capture an encrypted message communicated between the client and the content server; forward the encrypted message without modification to the destination address of the encrypted message; and decrypt the encrypted message using the decryption key to result in decrypted data and to use or store the decrypted data for other data processing.

In an embodiment, the logic is further configured to perform compressing the decrypted data to result in creating compressed data; forwarding the compressed data across a wide area network to a trusted intermediate node. In an embodiment, the encryption protocol is Secure Sockets Layer (SSL). In an embodiment, the encryption protocol is Transport Layer Security (TLS). To perform such WAN optimization, a node is not required to receive an HMAC value for the connection, but can only receive a cipher key to facilitate decryption, followed by compression, decompression at a far-end node, and re-encryption. Further, the optimized message still can be guaranteed as authentic since the intermediary nodes did not receive the HMAC value. In other embodiments, local application optimization may occur at an edge node, and if such optimization involves a change in content, then the HMAC can be provided.

In an embodiment, the key server is co-located with the content server. In an embodiment, the first network and the one or more second networks each comprise different first and second local area networks respectively.

In an embodiment, the apparatus comprises a first trusted intermediate node configured at an edge location in a wide area network and wherein the key server is configured in a second trusted intermediate node at a core location of the wide area network. In one feature, the second trusted intermediate node and the content server are within a single domain.

In an embodiment, the session identification data comprises a source network address, a destination network address, a source port number, and a destination port number, all obtained from a transport control protocol (TCP) header of the message. These values are sometimes termed the TCP 4-tuple. Additionally or alternatively, a Secure Sockets Layer (SSL) session identifier may be used. In an embodiment, the logic configured for establishing a secure connection to the key server comprises logic configured for establishing an IPsec tunnel from the apparatus to the key server. Alternatively, the secure connection may comprise another SSL session.

In an embodiment, a data processing system comprises a content server comprising a key server, wherein one or both of the content server and the key server are configured with logic which when executed implements an encrypted data communication protocol; a first trusted intermediate node configured at an edge location of a wide area network and comprising: a first network interface that is configured to be coupled to a client computer; one or more second network interfaces that are configured to be coupled to the wide area network and to the key server; a second trusted intermediate node configured at an core location of the wide area network and comprising: a third network interface that is configured to be coupled to the content server; a fourth network interface that is configured to be coupled to the first trusted intermediate node through the wide area network; wherein the network interfaces are configured to receive and forward all data communicated between the client and the server; logic in each of the first trusted intermediate node and the second trusted intermediate node encoded in one or more computer-readable media for operation and configurable when executed to cause a processor in the node to perform: establishing a secure connection to the key server; receiving session identification data for an encrypted session between the client and the content server during negotiation of the encrypted session between the client and the content server using an encryption protocol, and storing a copy of the session identification data; communicating a plurality of messages relating to the negotiation between the first trusted intermediate node and the second trusted intermediate node using data compression, decompressing the plurality of handshake messages at the first trusted intermediate node and the second trusted intermediate node, and forwarding the decompressed handshake messages without modification to the client or the content server according to a destination address in the handshake messages; receiving a message from the content server indicating that the negotiation is finished; requesting from the key server, over the secure connection, a decryption key associated with the encrypted session; receiving an encrypted message communicated between the client and the content server in the encrypted session; forwarding the encrypted message without modification to the client or the content server according to a destination address in the encrypted message; decrypting the encrypted message using the decryption key to result in decrypted data and using or storing the decrypted data in a storage unit.

In an embodiment, a network monitoring apparatus comprises a first network interface that is configured to be coupled to a first endpoint computer through a first network; a second network interface that is configured to be coupled to a second endpoint computer through a second network; wherein the first network interface and second network interface are configured to receive and forward all data communicated between the first endpoint computer and the second endpoint computer; a processor; logic encoded in one or more computer-readable media for operation and configurable when executed to cause the processor to perform: sending a request message to one or more of the first endpoint computer and the second endpoint computer to provide an encryption key that the first endpoint computer and the second endpoint computer are using to encrypt data communicated in a cryptographic session between the first endpoint computer and the second endpoint computer; wherein the request message comprises a session descriptor that describes the cryptographic session; receiving, from one or more of the first endpoint computer and the second endpoint computer, a reply message comprising a keyshare or a key that can be used to decrypt the data communicated in the cryptographic session; wherein the reply session descriptor is encrypted ; receiving an encrypted message communicated between the first endpoint computer and the second endpoint computer in the encrypted session; forwarding the encrypted message without modification to the first endpoint computer or the second endpoint computer according to a destination address in the encrypted message; decrypting the encrypted message using the decryption key to result in decrypted data and using or storing the decrypted data in a storage unit.

While one embodiment may use cipher keys, other embodiments may use any of the key types involved in a bi-directional SSL connection or session. For example, a bi-directional SSL session will use different cipher keys and HMAC values for upstream and downstream traffic. In an embodiment, the key server can provide a cipher key for decryption of upstream traffic without supplying the keys for decryption or authentication of downstream traffic. Further, the key server can provide cipher key(s) only, rather than both cipher and HMAC keys. Embodiments provide the flexibility to deliver one or several keys in any of many combinations, giving the key server fine-grained control over the trusted intermediate nodes on a per-session basis.

In other embodiments, the invention encompasses computer-implemented methods and computer-readable media.

2.0 Structural and Functional Overview

2.1 Secure Sockets Layer-Background

Secure Sockets Layer (SSL) and its successor Transport Layer Security (TLS) are successful encryption protocols that are widely used in data communications over public networks and internetworks, such as the public Internet. SSL streams are widely used to support confidential, authenticated communications between clients and hypertext transfer protocol (HTTP) or World Wide Web applications. In an embodiment, trusted intermediate nodes enable inspection, use and modification of SSL streams while maintaining end-to-end authentication and authenticity.

This document assumes that a reader is familiar with SSL. Detailed descriptions of SSL are provided in *SSL and TLS, Designing and Building Secure Systems* by Eric Rescorla and in *Network Security with OpenSSL* from O'Reilly. The online encyclopedia wikipedia.org has, at the time of this writing, a comprehensive article on Transport Layer Security. A detailed description of the SSL security model is found in Wanger et al., "Analysis of the SSL 3.0 protocol," available online at the time of this writing in the document "paper-ssl.pdf" at the domain schneier.com on the World Wide Web. The present description reviews some aspects of SSL that are most pertinent to the solutions described herein.

SSL makes communication secure, by encrypting traffic and thereby keeping communications private. SSL also provides authentication and ensures the authenticity of a received message. Because SSL is usually used over arbitrary networks that both the user and the destination service do not control, SSL provides means by which a client can guarantee that a network site is genuine. Further, SSL provides means to guarantee that a message sent from the client to server, or the server to the client, is authentic and was not changed in transit.

With conventional SSL, only end points participate in a security negotiation. Nodes between the end points cannot participate in a connection, decrypt traffic, or modify encrypted messages. However, evolving network services need to act on application data streams. When the data streams are encrypted using SSL, network services deployed in intermediate nodes, and not in end points, cannot perform services on the data streams. For example, a business enterprise may use a WAN link to connect branch offices to a headquarters, and effective application level compression techniques are available to increase the performance of the WAN links. However, SSL messages cannot be modified in transit, and therefore SSL messages traversing an application-level compression node cannot be optimized.

Past approaches to the problem generally have focused solely on the encryption attribute of the data stream, such techniques render a receiver unable to perform authentication and authenticity checks on par with an uninterrupted SSL connection. Past approaches include SSL Termination techniques and Connection Key Derivation (CKD) techniques. In SSL termination techniques, an SSL session is terminated at an Intermediary Service (IS) prior to the intended Destination Service (DS). The terminating device directly generates and responds to SSL handshake requests to and from the client. If a back-end SSL connection is required, then the IS acts as a client creating a new SSL connection to the DS. The IS often proxies the application traffic between the two SSL sessions. However, in termination techniques, end-to-end cryptographically strong authentication is not workable, because at best the client can authenticate the IS, but not the DS. Further, validation problems can occur if the IS presents a credential that uses a certificate authority (CA) previously unknown to the client. This is commonly cause by the IS having a self signed certificate versus one from a well known signing authority.

Still further, termination techniques disrupt SSL's end-to-end authenticity capability. The client must "trust" that the IS delivers its messages unchanged to the DS, because the client negotiates the hashed message authentication codes (HMACs) that are used to sign a message with the IS, rather than the DS. Conversely, the DS must "trust" that the IS delivers its messages unchanged to the client. End-to-end authentication is not possible, and the IS could intentionally modify content or innocently deliver incorrect content due to errors in configuration or implementation.

Termination techniques suffer from numerous other drawbacks including the inability to perform an end-to-end audit of a connection's trust properties; problems arising when revocation of digital certificates is necessary; the inability to limit the content of a message that the IS can access; challenges in arriving at the correct cipher suite; performance issues arising from the need to perform both decryption of inbound traffic and re-encryption of outbound traffic at the IS; deployment challenges such as certificate distribution;

Connection Key Derivation techniques are based on an understanding of how the SSL Master Secret and connection secrets are derived, and effectively provide an IS without terminating SSL. Using access to the private key of the destination service and by inspecting SSL handshake messages, a CKD solution can derive first the Master Secret and subsequently the keys for a specific connection. One example of connection key derivation (CKD) is the SSL plug-in for the open source packet sniffing tool WireShark, also known as Ethereal. Another example is IntruShield from McAfee. In one interpretation of the use of CKD, the client can be said to authenticate the IS and not the DS, since the IS has access to the private key of the DS and thus the IS has control over the content. Further, because the IS knows the private key of the DS, message authenticity is potentially compromised. Both the client and the DS must both "trust" the IS to deliver the correct site to the Client and to deliver the content correctly. Audit and traceability is a challenge using the CKD technique. Revocation of trust is difficult with CKD techniques. Access control to message content cannot be limited with CKD since the IS has access to the fundamental keys for all connections. Deployment is complicated, because the IS node's knowledge of the private key creates significant issues for revocation of trust, audit trail, and access control.

2.2 Trusted Intermediary Node Services

Figure 2:
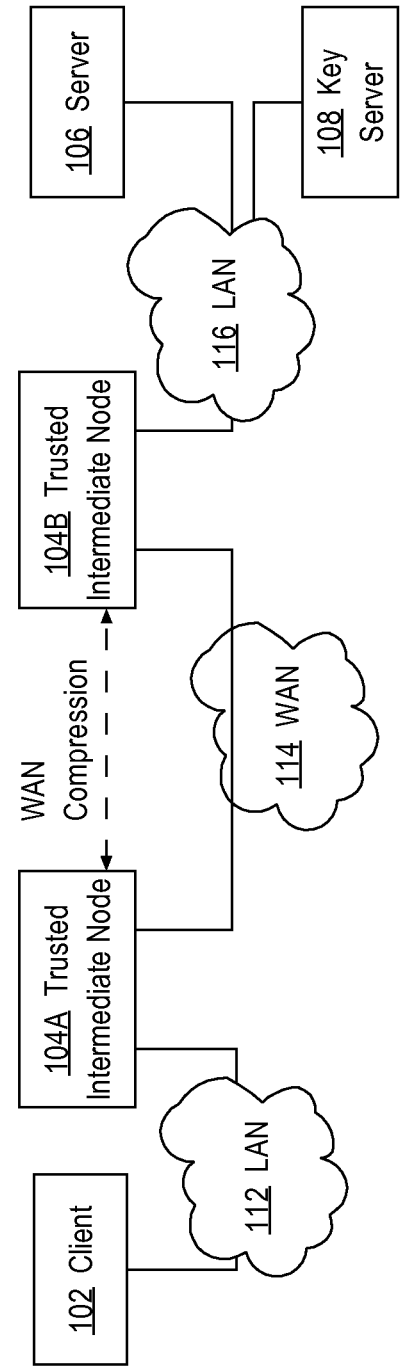
FIG. 2 illustrates a networked system in which trusted intermediate nodes communicate across a wide area network (WAN).

FIG. 1 illustrates a networked system of a client, trusted intermediate node, server, and key server. FIG. 2 illustrates a networked system in which trusted intermediate nodes communicate across a wide area network (WAN). Referring first to FIG. 1, in an embodiment, a client 102 is coupled on a first connection 101 directly or indirectly through one or more networks 110 to a trusted intermediate node (TIN) 104. Client 102 represents a computer of any kind including but not limited to a personal computer or wireless device. TIN 104 comprises a network node such as a router or switch, or a general-purpose computer not forming an element of network infrastructure, which is configured with logic that implements the functions described further herein.

TIN 104 has a second connection 105 to server 106, which represents an application server or other network resource that the client 102 seeks to access. TIN 104 is also coupled to a key server 108 by a third connection 103 that is logically separate from the connections of the TIN to the client 102 and to the server 106. In some sections herein the server 106 is termed a "content server" but that term is used purely to disambiguate from the key server 108, and the server 106 may serve any functional purpose not necessarily related to delivering content. The key server 108 is a logical entity that may comprise a process or software element hosted on server 106; a separate computer is not required to implement the key server.

The third connection 103 is a secure connection between the TIN 104 and the key server 108, and the third connection is established before the TIN begins processing messages between the client 102 and the server 106. The third connection 103 forms a secure side channel between the TIN 104 and the key server. The third connection 103 is configured using high grade authentication and privacy. For example, the third connection 103 is configured as an IPsec tunnel from the TIN 104 to the key server 108.

In the approach herein, an intermediary node such as TIN 104 can request and receive individual connection keys using a secure side channel between the TIN 104 and key server 108. The TIN 104 has no capability to calculate keys on its own. In all cases, TIN 104 uses the secure side channel to obtain the connection keys. The key server 108 may determine, based on stored policy, to provide only particular keys for a session or connection. For example, the key server 108 can provide a downstream cipher key alone to enable the TIN 104 to decrypt a data payload going from content server to client, a cipher key as well as an authentication (HMAC) key, or other combinations of key material of each direction upstream and downstream.

In an embodiment, the key server 108 comprises a connection key distribution service, denoted as Trusted Intermediary Node Key Service, at server 106, TIN 104, or another node. The Trusted Intermediary Node Key Service selects and serves unique connection keys such as client cipher key, server cipher key, client HMAC, etc., to the TIN 104. Multiple different trusted intermediary nodes 104, in different locations, can access the Trusted Intermediary Node Key Service to obtain connection keying material.

In an embodiment, only the server 106 needs direct access to the private key of a credential, which the server already holds in a conventional SSL scenario. The server 106 and the key server 108 may be co-located, and the key server may be implemented as a service running on the server 106. In such an arrangement, the key server 108 may obtain session keys that the server 106 negotiates with the client 102 using programmatic calls or other communications that do not traverse a network. As a result, the key server 108 acquires all keys that are negotiated. In an embodiment, the Trusted Intermediary Node Key Service comprises a policy engine that determines or gates which connection keys are distributed, and which nodes are allowed to receive connection keys.

In operation, the Client 102 makes a SSL handshake request towards the server 106. The TIN 104 is in the path of connection and keeps track of the connection progress but does not disrupt the handshake. In particular, the TIN 104 captures the values for the transmission control protocol (TCP) 4-tuple that uniquely define this connection and makes a request to the key server 108 on a side channel on connection 103. The TIN 104 provides the TCP 4-tuple in its request to the key server 108. The key server 108 supplies the TIN 104 with the appropriate connection keys for the SSL connection associated with the TCP 4-tuple, so that the TIN can decrypt the encrypted SSL stream and access information therein. Various other identifiers may be provided in the request to key server 108, such as SSL Session Id, for certain complex network topographies.

FIG. 2 illustrates an alternative arrangement in which a client 102 is coupled to local network 112, to which a first TIN 104A is coupled. The first TIN 104A is also coupled over a wide area network (WAN) 114 to a second TIN 104B, which is further coupled to a second LAN 116. A server 106 and key server 108 are coupled to the second LAN 116. In this arrangement, TIN 104A, 104B can perform compression of traffic on the SSL connection between the client 102 and the server 106 to reduce bandwidth consumed in communications over the WAN. The key server 108 may provide only a cipher key and not HMAC keys, which enables the TIN 104A, 104B to compress and decompress the data stream, but guarantees that endpoints receive authentic data without any need to establish a trust relationship with the TIN nodes. As the WAN may be coupled using slow network links, this approach improves throughput and speed of communication between the client 102 and the server 106. Alternatively, the key server may provide, in addition to cipher keys, the HMAC keys to TIN 104A, enabling TIN 104A to perform local traffic optimization functions, such as server images from cache, etc.; receiving the HMAC keys enables TIN 104A to re-sign the data payloads after performing such functions.

In operation of FIG. 2, both the TIN 104A, 104B operate as described above for FIG. 1. Thus, both the TIN 104A, 104B observe the SSL handshake of the client and server, capture and store TCP 4-tuple values, request connection keys from the key server 108 using the 4-tuple values, and receive the connection keys. The first TIN 104A can decrypt traffic that the client 102 has encrypted, compress the traffic, and pass the traffic in compressed form to the second TIN 104B. The second TIN 104B can decompress the traffic, re-encrypt the traffic using the connection keys, and forward the encrypted traffic to the server. Authentication of the traffic is maintained because the TIN nodes are trusted and do not modify the traffic other than to compress it.

Figure 3:
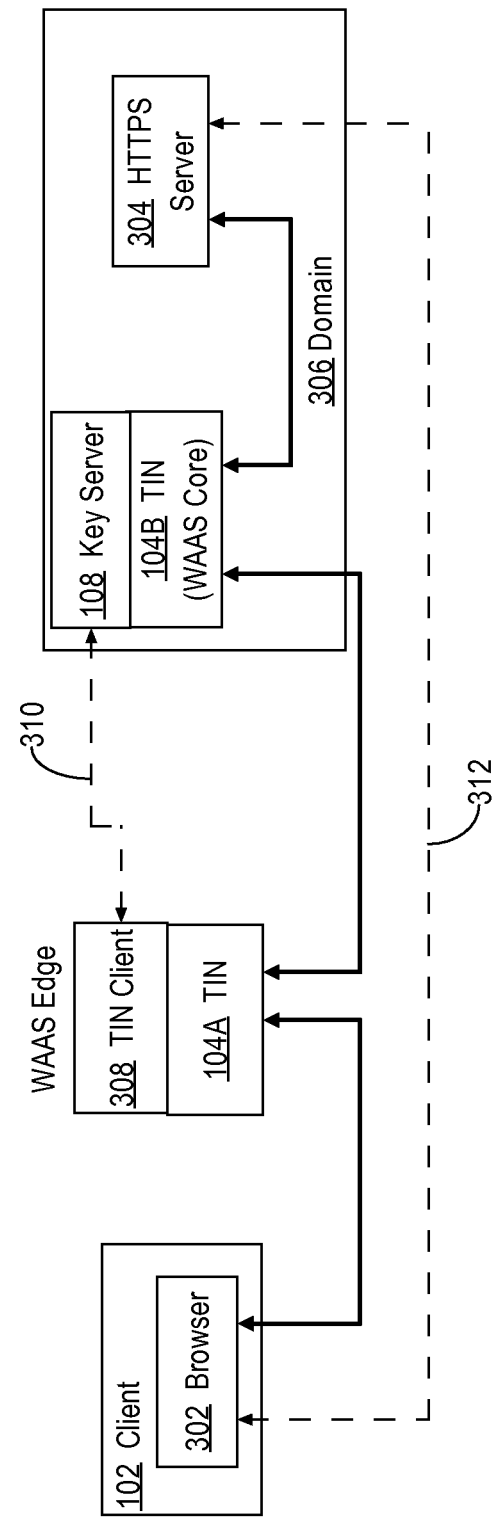
FIG. 3 illustrates a system in which trusted intermediate nodes participate in a wide area application services (WAAS) network.

FIG. 3 illustrates a system in which trusted intermediate nodes participate in a wide area application services (WAAS) network. In an embodiment, client 102 comprises a browser 302 that is coupled to a TIN 104 in an edge position of a WAAS network. The TIN 104A hosts a TIN client 308 that is logically coupled to a key server 108 that is integrated into a TIN 104B in the WAAS core. TIN 104B is coupled to HTTPS server 304, and both the TIN 104B and HTTPS server are within a single administrative and security domain 306. In this arrangement, browser 302 can establish a conventional control path to server 304 for communicating HTTP transfers. TIN client 308 of TIN 104A maintains a logical side channel 310 to key server 108. Accordingly, TIN 104A can request and receive decryption keys or other keys from the key server 108 on side channel 310, and TIN 104B can obtain such keys directly from the key server, e.g., by an API call or other programmatic action.

The logical side channel 310 is established between the TIN 104A and TIN 104B using a separate security mechanism before browser 302 and HTTPS 304 begin a session. For example, TIN 104A and TIN 104B can establish an IPSec tunnel as the logical side channel 310 as part of a bootstrap loader sequence when the TIN nodes start up.

Figure 4A:
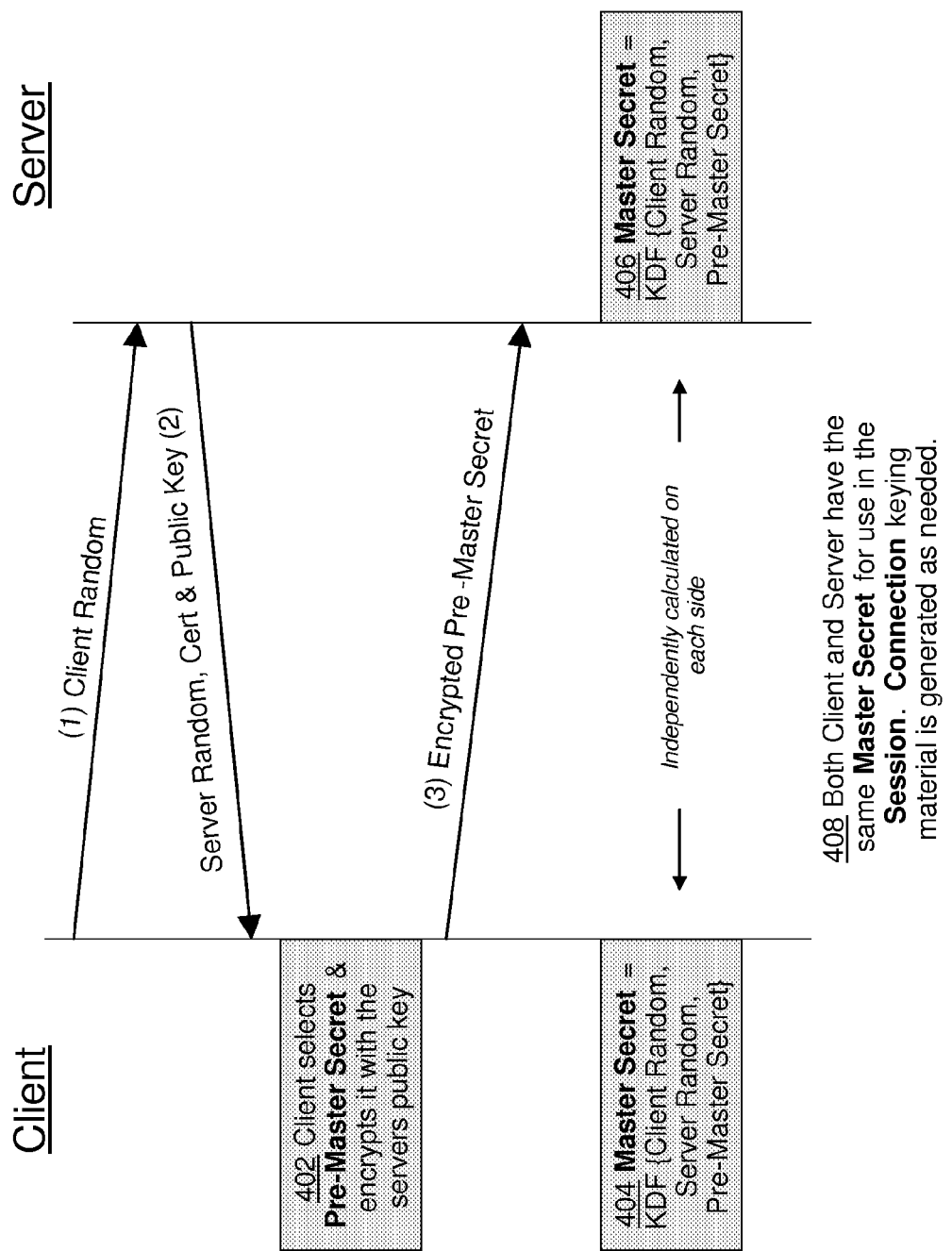
FIG. 4A illustrates a client and server determining a shared master secret.

FIG. 4A illustrates a client and server determining a shared master secret. In an embodiment, in step 1 the client sends a random value to the server. The server responds at step 2 and provides a server random value, digital certificate and public key. In response, at step 402 the client selects a pre-master secret value and encrypts the pre-master secret using the public key received from the server. The client then sends the encrypted pre-master secret to the server at step 3.

In steps 404 and 406, which occur relatively concurrently, the client and server each privately compute a master secret value, which is the output of a key derivation function (KDF)

that receives the client random value, server random value, and pre-master secret value as inputs. As a result, at step 408, both the client and the server derive the same master secret for use in a communication session between the client and the server. However, keys for individual SSL connections within the session, each typically associated with a TCP connection between the client and server, are computed later when a connection initiates.

FIG. 4B illustrates a client and server determining connection keys for encrypted connections. After completing the steps of FIG. 4A, the client and server may establish a first TCP connection. To secure data transmitted on the connection, the client and server each independently compute a connection key, which is the output of the key derivation function based on input comprising the client random value, the server random value, the master secret, and a first label, as shown in step 410, 412. The label may be a sequence number or other value associated with the TCP connection. As a result, a first encrypted TCP connection 414 is established. Data transferred over the connection is encrypted using the first connection key.

As shown in steps 416, 418, any number of additional connection keys may be independently derived by each of the client and the server to form one or more additional encrypted TCP connections 420.

Figure 5:
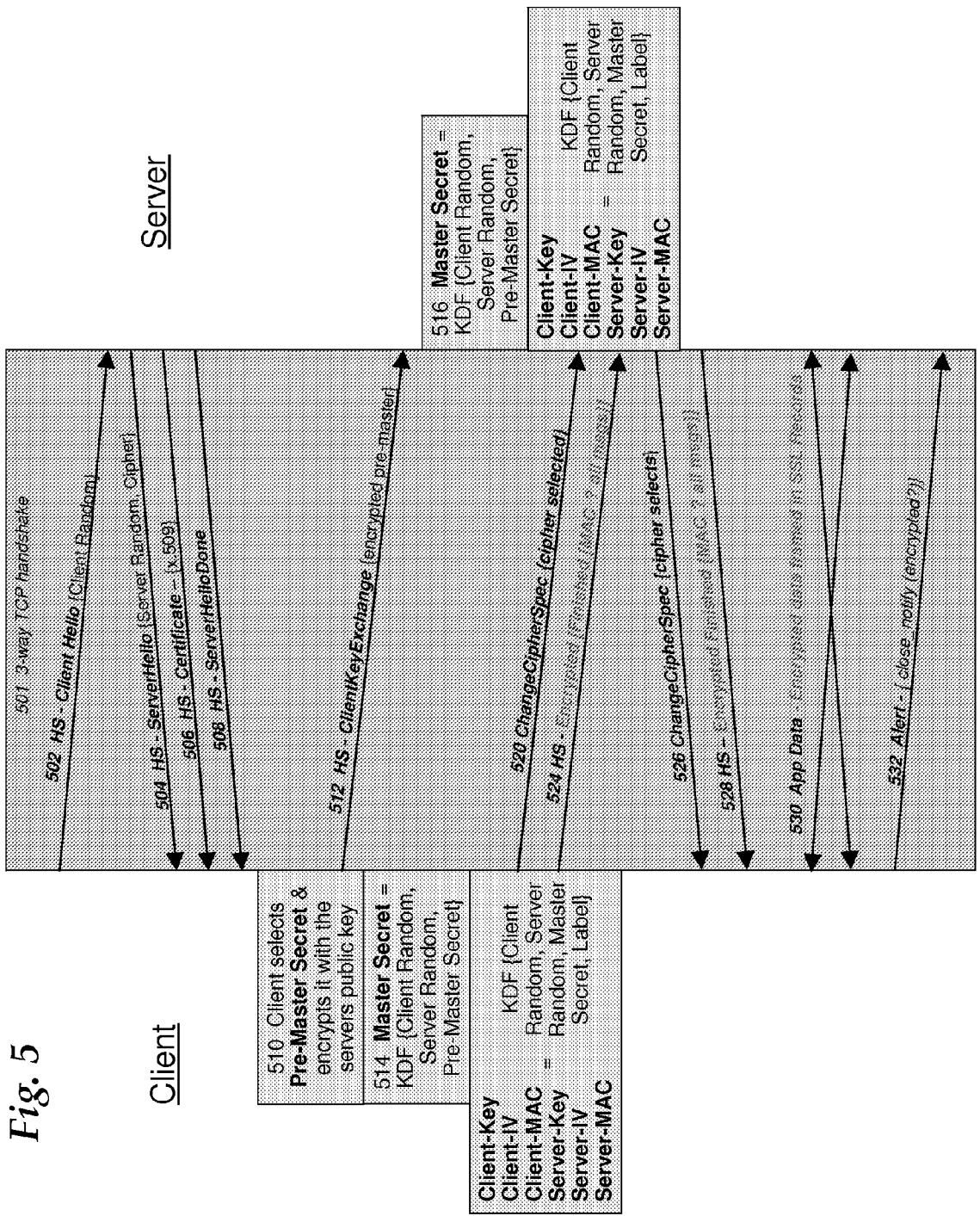
FIG. 5 illustrates a client and server establishing an encrypted connection and transferring encrypted application data.

FIG. 5 illustrates a client and server establishing an encrypted connection and transferring encrypted application data. In an embodiment, the client and server perform a three-way TCP handshake 501. In step 502, the client sends a Client Hello message 502 containing the client random value. In response, the server sends a Server Hello message 504 containing the server random value and a cipher value, a Certificate message 506 that contains a digital certificate for the server, and a Server Hello Done message 508 announcing that the server has sent the preceding items.

In response, the client selects the pre-master secret value at step 510, encrypts the pre-master secret with the server public key and sends the encrypted pre-master secret to the server in a Client Key Exchange message 512.

In step 514 and step 516, the client and server each independently compute the same master secret value. The client and server also each independently compute one or more client connection keys, IV, MAC, and server connection keys, IV, and MAC. The client may determine that it wants to use a different cipher, for purposes of encrypting data on connections with the server, than the cipher identified in the Server Hello message 504, or may agree to use the cipher that was identified. The client sends a Change Cipher Spec message 520 that identifies the selected cipher. The client also sends a Finished message 524 that is encrypted using the connection key and signed with the MAC.

In response, the server determines whether the proposed cipher is acceptable. The server sends to the client a Change Cipher Spec message 526 that identifies the finally selected cipher. The server also sends a Finished message 528 that is encrypted and signed with the server MAC.

At this point the client and server can exchange one or more application data messages 530, each of which is encrypted and framed in SSL records. To close the connection, the client can send an Alert message 532.

Figure 6:
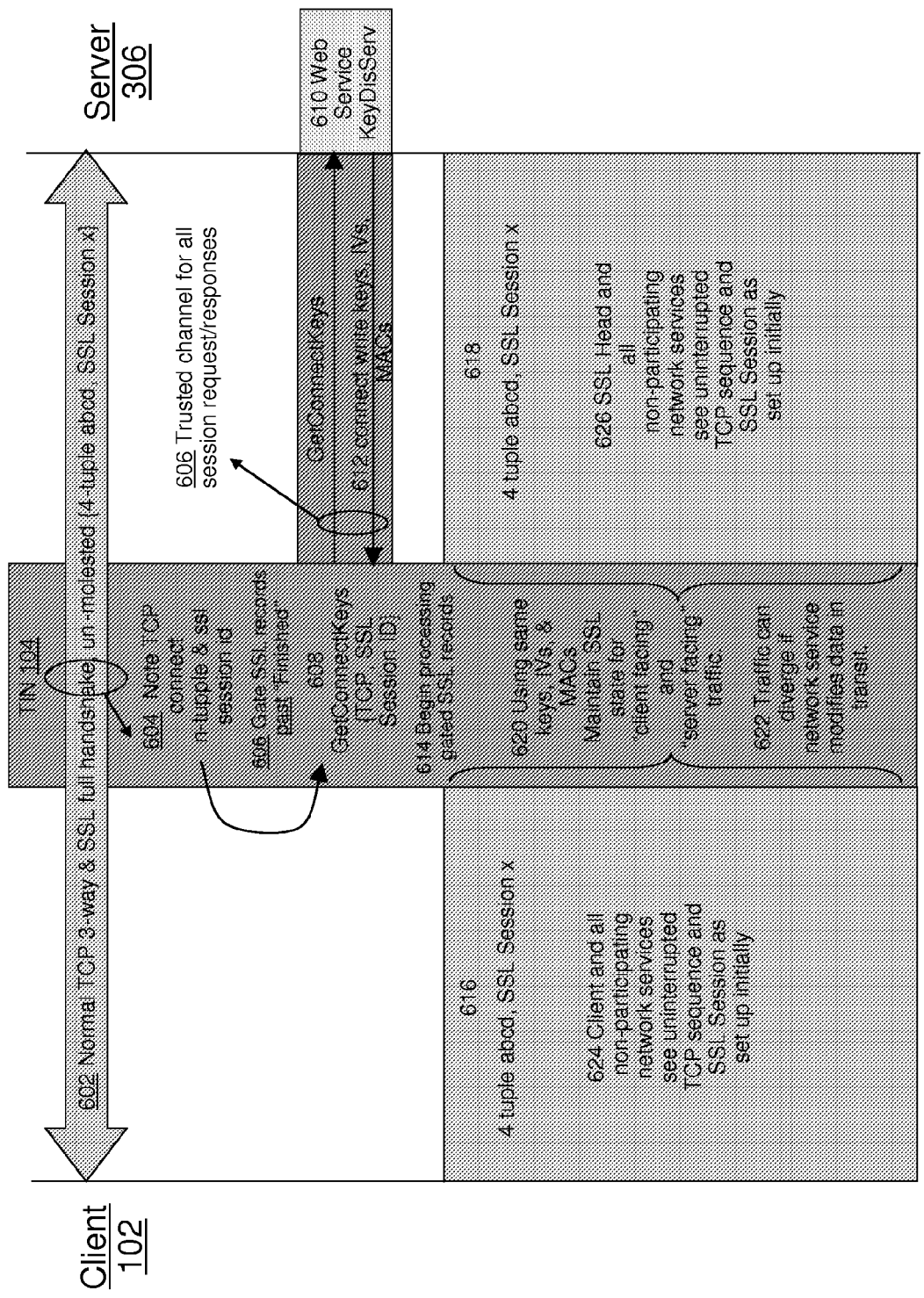
FIG. 6 illustrates a trusted intermediate node obtaining connection keys for an encrypted connection between a client and a server.

FIG. 6 illustrates a trusted intermediate node obtaining connection keys for an encrypted connection between a client and a server. In step 602, client 102 and server 306 perform a conventional TCP 3-way handshake and an SSL handshake as described above. As a result, a TCP 4-tuple of values is selected and an SSL session identifier x is selected.

Messages involved in the TCP handshake and SSL handshake pass through the TIN 104. In step 604, the TIN 104 observes and stores the TCP connection 4-tuple of values and the SSL session identifier. TIN 104 now has enough information to make a request to the key server 610 for connection keys.

In step 608, the TIN 104 sends a Get Connect Keys request message to a Key Discovery Service 610 associated with server 306. The Key Discovery Service 610 is implemented, in one embodiment, as a web service that is compatible with other Web Services protocol definitions. In an embodiment, the Get Connect Keys request message provides the TCP 4-tuple of values, and optionally the SSL session identifier. The Get Connect Keys message is sent over a trusted channel 606 that is used for all key requests and responses for a session. Obtaining the connection keys is indeterminate especially with respect to time and policy. The TIN 104 can handle the ambiguity a variety of ways. The most graceful is for the TIN 104 to stall the Server Finished handshake message. The SSL handshake is not deemed complete until this Finished Message is received and process successfully by the client.

Alternatively, TIN 104 may elect to allow encrypted message traffic to occur up to a arbitrary amount storing the traffic for later decryption when the keys arrive. This approach is useful to address certain operational issues that may arise when available cryptography software is used in an implementation. For example, the client finished message is sent encrypted, but in the commonly-used cryptography library known as OpenSSL, server-side connection keys are not generated until the client finished message actually arrives. Thus, the keys are not available for the TIN when it first receives the client finished message. If the TIN did not forward the client finished message until it had the keys, then the keys would never be created; therefore, in an embodiment, the TIN stores the client finished message but also sends the message. Storing the message enables data in the message to be processed in the crypto engine of the TIN to keep the crypto engine synchronized. As an extension, an arbitrary amount of data can be allowed to flow even if keys are not present, which overcomes the problem of a connection stalling due to delays in getting keys. This approach may be useful in low-latency situations as a tradeoff between inspection and performance.

In response, Key Discovery Service 610 determines whether to provide keys to the TIN 104. If the determination is positive, then the Key Discovery Service 610 provides one or more connection write keys, IV values, or MAC values in a response message 612 that is sent over the trusted channel 607. Based on stored policy, the Key Discovery Service 610 can determine whether to provide a cipher key, an HMAC key, or both, for each connection or session. The TIN 104 then begins processing SSL records at step 614. For example, the TIN can use the received keys to decrypt payloads and inspect payload contents, copy payload contents to other systems, perform WAN compression or decompression, etc.

As shown in step 620, the same keys, IVs and MACs can be used for other messages which are exchanged on the same connection. The TIN 104 can maintain SSL state data for client-facing traffic and server-facing traffic. Further, as shown in step 622, the TIN 104 can modify data in transit and cause the traffic to diverge to another node. In this case each message will have to be resigned by the appropriate HMAC key prior to re-encryption.

During the processing of SSL records by the TIN 104, the previously selected TCP 4-tuple and SSL session identifier x are used at step 616 in messages from the TIN to the client and at step 618 in messages from the TIN to the server. Therefore, as stated at step 624, the client and all network services other than the TIN receive uninterrupted TCP sequence values and SSL session information as originally set up. Further, as stated at step 626, the SSL head end at server 306 and all network services other than the TIN receive uninterrupted TCP sequence values and SSL session information as originally set up. As a result, client 102 and server 306 can continue to communicate using an end-to-end SSL connection even though the TIN 104 is able to decrypt, inspect and use payload contents, or perform WAN compression with decryption and re-encryption performed in different TINs on either side of the WAN. Moreover, the use of TCP is not required and the particular values of the TCP variables are not important; embodiments are operable independent of TCP processing, which may use proxies, network address translation, or other processing without affecting operation of an embodiment.

Figure 7:
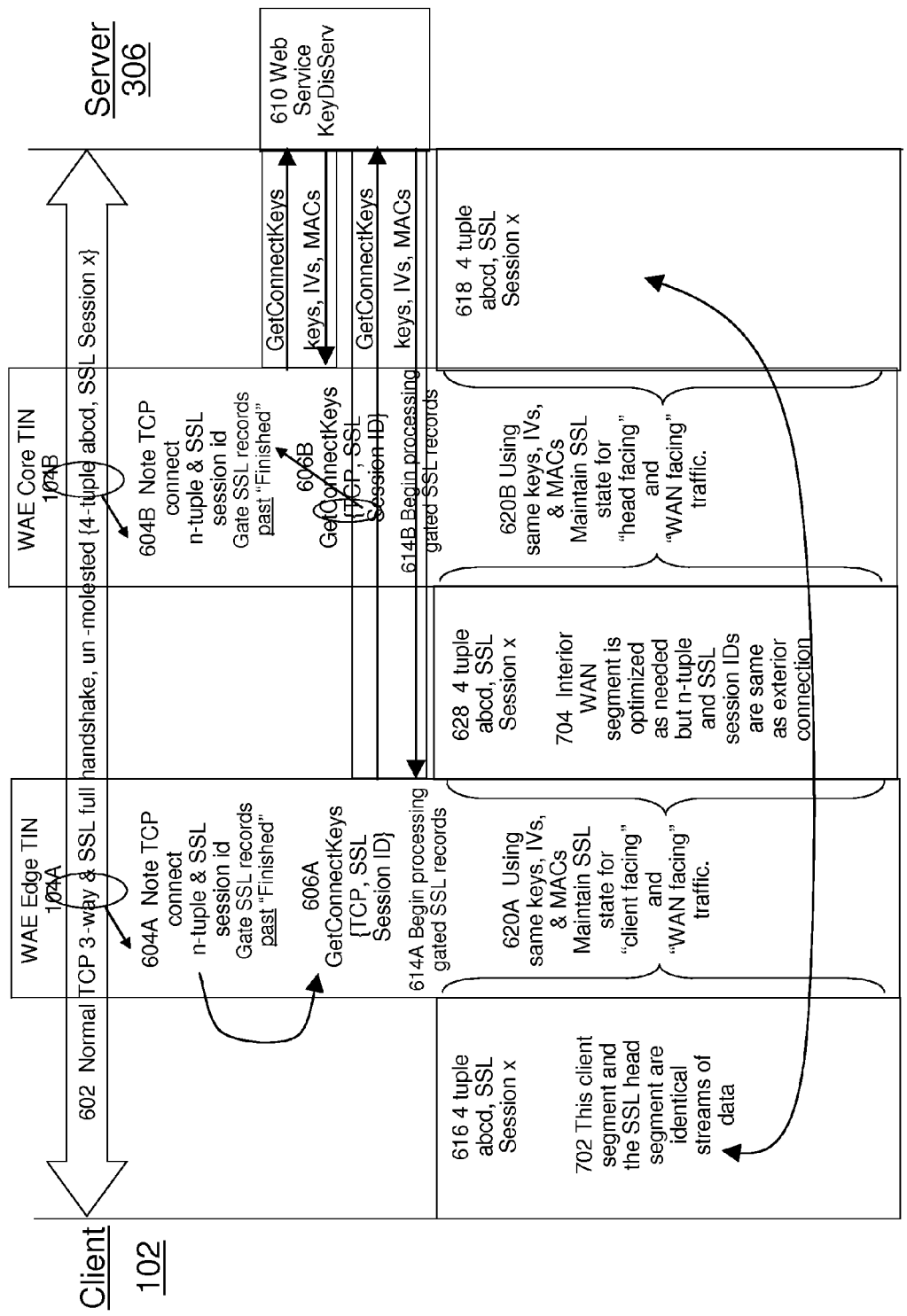
FIG. 7 illustrates two trusted intermediate nodes in a wide area network obtaining connection keys for an encrypted connection between a client and a server.

FIG. 7 illustrates two trusted intermediate nodes in a wide area network obtaining connection keys for an encrypted connection between a client and a server. FIG. 7 illustrates a process involving the elements shown in FIG. 2 comprising a client 102, WAN edge TIN 104A, WAN core TIN 104B, and server 306.

In step 602, client 102 and server 306 perform a conventional TCP 3-way handshake and an SSL handshake as described above. As a result, a TCP 4-tuple of values is selected and an SSL session identifier x is selected.

Messages involved in the TCP handshake and SSL handshake pass through each of the TINs 104A, 104B. In step 604A, the TIN 104A observes and stores the TCP connection 4-tuple of values and optionally the SSL session identifier.

TIN 104 now has enough information to make a request to the key server 610 for connection keys.

In step 606A, the TIN 104A sends a Get Connect Keys request message to a Key Discovery Service 610 associated with server 306. The Get Connect Keys message is sent over a trusted channel that is used for all key requests and responses for a session. The TIN 104B can request the same keys in a similar manner by sending a separate Get Connect Keys request message at step 606B.

In response to each of the messages 606A, 606B, Key Discovery Service 610 determines whether to provide keys to the requesting TIN 104A, 104B. If the determination is positive, then the Key Discovery Service selects and provides one or more connection write keys, IV values, or MAC values in separate response messages that are sent over the trusted channel. Based on stored policy, the Key Discovery Service 610 can determine whether to provide a cipher key, an HMAC key, or both, for each connection or session. Each TIN 104A, 104B then begins processing SSL records at step 614A, 614B. For example, each TIN 104A, 104B can use the received keys to decrypt payloads and inspect payload contents, copy payload contents to other systems, perform WAN compression or decompression, etc. Obtaining the connection keys is indeterminate especially with respect to time and policy. The TIN 104A & 104B can handle the ambiguity a variety of ways. The most graceful is for the TIN 104A & 104B to stall (temporarily delay forwarding) the Server Finished handshake message. The SSL handshake is not deemed complete until this Finished Message is received and processed successfully by the client. Alternatively TIN 104 may elect to allow encrypted message traffic to occur up to a arbitrary amount storing the traffic for later decryption when the keys arrive.

As shown in step 620A, 620B, the same keys, IVs and MACs can be used for other messages which are exchanged on the same connection. Each TIN 104A, 104B can maintain SSL state data for WAN-facing traffic and for either client-facing traffic or server-facing traffic depending on the position of the TIN with respect to the WAN.

Further, as shown in step 704, the TINs 104A, 104B can cooperate to optimize traffic carried within the WAN segment, using the same TCP 4-tuple and SSL session ID values as used on the exterior connections to the client and the server.

During the processing of SSL records by the TIN 104, the previously selected TCP 4-tuple and SSL session identifier x are used at step 616 in messages from the TIN 104A to the client and at step 618 in messages from the TIN 104B to the server. As stated at step 702, the data segment received at the client and the data segment received at the server 306 are identical streams of data even if WAN optimization is performed in the WAN interior at step 704. This behavior creates the opportunity to supply TIN 104A & 104B with cipher keys only. Since the original message sent by client or server is the same as the message received by server or client the original HMAC is still valid. Thus the TIN 104A and 104B have no requirement to have access to the HMAC keys.

2.3 Benefits of Certain Embodiments

Using the approach herein, the Client 102 can authenticate to the server 106 unhindered by the TIN in the connection chain. The Client 102 in a cryptographically strong way is able to authenticate the server 106, not some impersonation of the server 106. Such end-to-end authentication is enabled by the SSL handshake occurring directly between the Client 102 and server 106 without involvement of a proxy. Server 106 has access to the private key of the Credential and therefore server 106 is the only entity that can "prove" its identity to the Client 102 in a cryptographically strong manner.

Further, using the approach herein a connection between the Client 102 and server 106 can only be started with a cryptographically strong authentication of the server 106 by the Client 102. Consequently, the approach herein provides authentication equivalent to that of an unmodified SSL connection.

The Credentials authenticated by the Client 102 are obtained directly from the server 106. Thus the Client 102 has the correct information to validate the Credential and make informed decisions on whether to proceed with the connection or not. Further, since the Credential is from the server 106, no new complexity is introduced with respect to the use of a certificate authority.

Client side certificates work seamlessly with the approach herein because the SSL handshake is carried out end-to-end between the Client and server 106. Client credentials are incorporated in the primary messages of the SSL handshake with the information ultimately hashed into the HMACs of the finished messages. Thus client side certificates are only supported when the handshake is end-to-end.

The present approach supports audit and traceability. From the perspective of Client 102, the connection is from the server 106 with no indication that a TIN may be in the path. An audit trail accurately represents authentication, namely that the Client has initiated a connection with the server 106 and not with an impersonator. Further, the approach herein improves the ability to audit the server 106, because the server is responsible to provide individual connection keys to a TIN and the server can track such distribution.

The approach herein also can accommodate the capability of SSL to authenticate messages with a hashed message authentication code (HMAC).

In an embodiment, the HMAC keys that are used for handshake authenticity are the same as those used for application data authenticity. Further, separate HMAC keys are used for messages generated by the server 106 and messages generated by the Client 102. Individual handshake messages carry no authenticity information, yet at the end of the handshake, using a "client finished message" and a "server finished message," the client and server each create an authenticity signature that incorporates all of the messages that have been part of the conversation to that point. The purpose of the authenticity signature is to protect against replay attacks and downgrading attacks if an unintentionally weak cipher is chosen for an otherwise well formed connection. The SSL protocol requires that the "client finished message" shall be sent and processed prior to the "server finished message". Once the handshake is complete each individual message from client or server carries a HMAC code created using the HMAC key guaranteeing authenticity of the message regardless of message type.

The approach herein does not affect this process, if HMAC keys are not distributed using the key server 108. When HMAC keys are not distributed to a TIN, then messages are guaranteed to delivered, unchanged, from client to server and from server to client. However, in an alternate embodiment, HMAC keys may be distributed from the key server 108 to a TIN.

When the server 106 has received the "client finished message" from client 102, the server 106 is guaranteed that the handshake is authentic. However, to reach the same confidence level, the Client must receive the "server finished message" from the server 106. Ideally, the server 106 would wait until the Client 102 has received this message prior to handing out the server HMAC key via key server 108. However, the only way that server 106 can determine that this message has been received by the Client 102 is when the server 106 receives the next message from the Client, and the next message usually contains encrypted application data.

Providing the server HMAC key to a TIN prior to the Client processing the server finished message creates a risk that the "server finished message" could be modified in flight to take into account some other change that was previously spoofed onto the Client. The spoofing of an earlier handshake message would have been identified by the server 106 when it processed the client finished message, because the Client record of what was sent and received would not match the record of what the server 106 sent and received up to that point. Replay is not an issue since the Client always selects a variable called the "client random" at the beginning of each connection making it immune to replay attacks. Further at the point after the client has sent the "client finished message" the client only is awaiting a valid "server finished message". Even though a TIN may have the server HMAC key prior to this message traversing it, and thus would have the ability to modify the message, the client is in a state in which only the real "server finished message" from the server will allow the connection to proceed. Further, implicit in providing a HMAC key to a TIN is the understanding from the server that messages may be modified, thus trust has been granted.

As previously stated, in conventional SSL, each application message between the Client and server 106 carries an individual HMAC for authenticity. In various embodiments, the key server 108 can provide HMAC keys in various ways. In one embodiment, key server 108 provides only the server HMAC key to a TIN. In another embodiment, key server 108 provides only the client HMAC key to a TIN. In other embodiments, both of the HMAC keys or neither HMAC key is provided to the TIN. When a HMAC key is not given out, the message traffic authenticated with that key is guaranteed to be unchanged end-to-end period. When HMAC key(s) are distributed a TIN may change the message payload as needed and resign the message such that the receiving side will accept the message as authentic. If HMAC keys are supplied to a TIN then the corresponding Cipher key must be supplied as HMAC keys can only act on decrypted data.

In an embodiment, server 106 controls the keys that it provides for each connection. When the server 106 stops providing keys, a TIN cannot intercept traffic. Therefore, the server 106 can control revocation of trust in the approaches herein. Keys that have been served out on an ongoing connection cannot be revoked. If HMAC keys have not been given out, then one side can stop communication and the other side will not be able to accept more messages. Such an approach does not preclude the one side from continuing to send traffic until a response is needed from the other side. If HMAC keys have been given out then it is possible that a TIN could mask a disconnect from one side to the other.

The server 306 in cooperation with the key server 610 also can control access to keys in a fine-grained manner. Available keys include keys for a server cipher, client cipher, server HMAC, and client HMAC. Some ciphers require an initialization vector (IV), and for such a cipher the IV is provided with the associated client or server cipher key. For example, assume that a TIN 104 is required to inspect outbound traffic for policy compliance to guard against "data leakage" from a business enterprise. The TIN 104 only needs the server cipher (and associated IV if any) to perform such a function, and therefore the key server 610 can provide only the server cipher to the TIN, accomplishing fine-grained control of key distribution. Assume further that the TIN 104 is only required to inspect traffic destined to a certain location. The server 306 and key server 610 can control key access by not issuing keys to connections that do not need to be accessed. For example, HMACs are not required in the foregoing scenarios, and therefore the server 306 and key server 610 should not distribute the HMACs but can provide only cipher keys.

In the WAN acceleration example of FIG. 2, the approach herein provides numerous benefits. One mode of WAN acceleration relies on deep stream compression. To perform this task the WAN devices that straddle the WAN 114, such as TIN 104A, 104B of FIG. 2, need clear text access to the encrypted SSL stream. However, although the WAN segment is highly compressed, the LAN traffic to and from the Client 102 and server 106 on either side of the WAN 114 is received and arrives untouched. Therefore, key server 108 may only issue the cipher keys for TIN 104A, 104B to accomplish its task; in particular, the HMAC keys are not issued to the TINs. Accordingly, the approach herein allows WAN compression to occur, yet end-to-end authenticity is guaranteed; this combination is not possible in prior approaches.

The approach herein also results in using the correct cipher suite. A cipher suite selection process is part of the SSL handshake. Because the handshake is guaranteed to be authentic end-to-end, a TIN does not interfere with the cipher suite chosen by the Client 102 and server 106.

The approach herein also requires fewer resources than prior techniques, because a TIN 104 does not need to perform public key-private key operations. For example, RSA decryption operations do not need to be done on the TIN 104. A TIN 104 does perform bulk encryption of messages, and in some cases generates HMAC values and validates messages. Such operations do not require unusual resources and existing hardware platforms for a TIN, such as routers and switches, can be configured to support TIN operations using a software upgrade without adversely affecting performance.

Overhead and network traffic associated with the third connection 103 to the key server 108 is considered insignificant.

In an embodiment, server 106 is configured to support the approach herein and to implement a key server 108 as described herein. Alternatively, the key server 108 may be implemented in a separate network node that is configured to serve keys to a TIN 104 on behalf of the server 106. The key server 108 can be located adjacent to the server 106, and while adjacency is not required, co-location may strengthen the trust relationship of the key server 108 and the server 106.

Embodiments can implement static keys or ephemeral keys in scenarios in which the client 102 performs authentication or uses client certificates, such as DSS or RSA certificates. Ephemeral keys can be fully supported using key server 108 co-located on server 106. When the key server 108 is separate from the server 106, then the key server has a man-in-the-middle role to accommodate the ephemeral keys.

The design does not modify the SSL protocol. As such existing clients, which are numerous, do not require modification and will interoperate with the approaches herein.

3.0 Secure Key Share Transport for Monitoring IPsec Connections

In an embodiment, IPsec connections can be monitored by giving a monitoring entity, which may comprise a firewall, sniffer, or other network monitoring apparatus, access to a decryption key in a manner that is secure and that works with the multitude of cryptographic protocols that are currently used. For purposes of describing a clear example, this description assumes that the cryptographic session involves only two endpoints. Extensions to multipoint protocols can be accomplished in other embodiments. According to an embodiment:

1) the monitor is not given the encryption keys without the consent of all of the participants in the cryptographic connection,
2) the participants can authenticate the legitimacy of the monitoring request,
3) the confidentiality of the keys is protected,
4) the approach works with arbitrary key management and bulk encryption protocols, and
5) it is possible to give the keys of a currently active session to the monitor.

In certain embodiments, one or more of these attributes may not be implemented. In an embodiment, the keys used to provide message authentication, entity authentication, and those used in key management are not provided to the monitor.

In an embodiment, a monitoring device requests encryption keys from endpoints. In an embodiment, after the endpoints have set up a cryptographic session (that is, after the key-management phase has completed), the monitoring device requests the session decryption keys from an endpoint, and does not allow session traffic from that endpoint to pass until it receives those keys. An endpoint can verify the authenticity of the requests from the monitor by verifying a digital signature that the monitor provides with its messages.

Further, confidentiality of the key that is provided back to the monitor can be provided by using public key encryption. For example, in one embodiment, an endpoint receives a public key of the monitor in advance, in a request message, or from a key registry. Only the monitor needs to have public keys. The endpoints need not be able to authenticate themselves to the monitor; the security assessment of the endpoints' traffic is done by the monitor using methods other than cryptographic authentication. Symmetric key encryption also can be used in other embodiments.

In an embodiment, a request message comprises: a session descriptor, which describes the cryptographic session that the monitor is interested in (e.g. address, port numbers, protocol); a random or pseudorandom nonce value; and a digital signature. Optionally, the request message may provide a public key of the monitor to the endpoint. Upon receiving such a request message, the endpoint verifies the digital signature, verifies that the endpoint is involved in the cryptographic session specified in the request, and determines whether to provide a key to the monitor. The endpoint then sends a reply message. These functions may be implemented in the endpoint in program logic of a security module, or program logic that implements a cryptographic protocol such as IPsec, SSL, TLS, etc.

In an embodiment, a reply message from an endpoint comprises a session definition structure that has been encrypted using the monitor's public key. The session definition structure contains either a key or a keyshare for each key in the protocol, and either the nonce sent in the first message or an error code. The error code is provided if the endpoint has determined not to consent to distribution of the key, or if the endpoint could not verify the digital signature.

An example session descriptor for the request message comprises a data structure having the following fields and values:
protocol: esp
spi: 0xdeadbeef
cipher: 3des
direction: sender
keyshare: NNN (arbitrary value or null)

An example session descriptor for the reply message is:
protocol: esp
spi: 0xdeadbeef
cipher: 3des
direction: receiver
keyshare: yyyyyyyyyyyyyyyyyyyy In one embodiment, a particular public-key based key transport protocol is adapted to incorporate the request and reply protocol defined herein. Such an approach of adapting an existing protocol removes the burden of preparing a security proof for the adapted protocol. In various embodiments, the ANSI financial cryptography suite or IEEE P1363 may be used.

In one embodiment, optionally the monitor sends a request to both endpoints, and the protocol completes successfully only if both endpoints comply with the request. Successful completion can be constrained in this approach using a key splitting technique. In an embodiment, if an endpoint concurs with the request, then that endpoint sends a keyshare to the monitor. Given all of the keyshares, then the monitor can compute the key; without either one of the keyshares, the monitor has no information about the key. Using this approach, delivery of a key is conditioned on consent by both the endpoints.

In an embodiment, the key share approach computationally operates as follows:

1. Let K=session key and let B=blinding value.
2. Let S_a=K (+) B=key share of A
3. Let S_b=B=key share of B
4. The monitor computes K as S_a (+) S_b.

In an embodiment, the identities of A and B are unambiguous, so that a single device cannot be tricked into responding both as A and as B. In an embodiment, a role is assigned to a device as a part of the protocol definition. Alternatively, A can be denoted a 'sender' and B can be denoted a 'receiver'; in this alternative, the A/B role would vary across the different key shares in each message (e.g. an ESP SA pair or TLS key set).

The blinding value is secret with respect to the endpoints. However, the key transport approach herein can be used in the absence of a method for establishing shared secrets dedicated for this purpose. In an embodiment, B is the output of a one-way hash function applied to K, e.g. B=SHA-1(K).

In this approach, distribution of keys is conditioned upon the consent of an endpoint. Embodiments are useful in various scenarios and applications, including but not limited to:

1. a network in which there is no provision for security monitoring on the endpoints;
2. a network in which cryptographic connections from less-trusted applications (e.g. VBSCRIPT, legacy systems) need to be allowed;
3. a visitor to a corporate LAN making a cryptographic connection across the Internet to his home network. In this scenario, multiple trust domains exist. The visitor must reveal traffic to an inspection point on the host network in order to be allowed the connection; however, the visitor's traffic is still protected as it crosses the Internet.

Embodiments are workable through NAT/PAT when implemented in a NAT/PAT service on a firewall having the capability herein, but embodiments have limited utility in other NAT/PAT cases. In one embodiment, in a STUN-like approach, the endpoint sends out a UDP packet with the same port number as that of the cryptographic session in order to discover the proper port mappings.

In embodiment, to implement the dual-consent option with keyshares as described herein, both endpoints are configured to operate the protocol herein, and are configured to verify the public key of the firewall.

In one embodiment, two cryptographic sessions are established, comprising a different session between the firewall and each of the endpoints. In this approach, the firewall and each external endpoint must be able to authenticate each other, and must be configured to allow the connection. This approach would double the computational load of the firewall, and would increase the latency of the traffic.

4.0 Implementation Mechanisms—Hardware Overview

Figure 8:
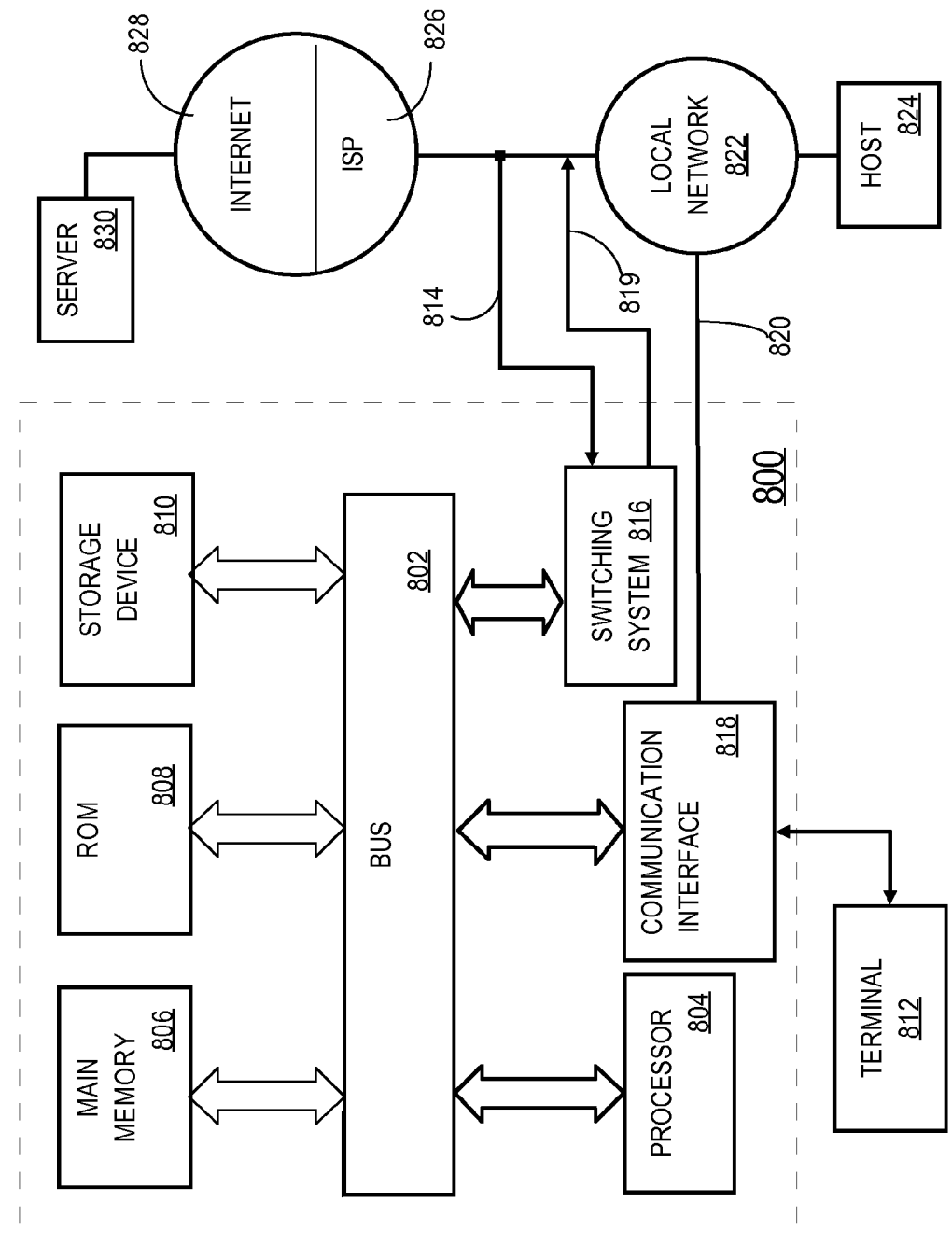
FIG. 8 illustrates a computer system upon which an embodiment may be implemented.

FIG. 8 is a block diagram that illustrates a computer system 800 upon which an embodiment of the invention may be implemented. The preferred embodiment is implemented using one or more computer programs running on a network element such as a router device. Thus, in this embodiment, the computer system 800 is a router.

Computer system 800 includes a bus 802 or other communication mechanism for communicating information, and a processor 804 coupled with bus 802 for processing information. Computer system 800 also includes a main memory 806, such as a random access memory (RAM), flash memory, or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk, flash memory or optical disk, is provided and coupled to bus 802 for storing information and instructions.

A communication interface 818 may be coupled to bus 802 for communicating information and command selections to processor 804. Interface 818 is a conventional serial interface such as an RS-232 or RS-422 interface. An external terminal 812 or other computer system connects to the computer system 800 and provides commands to it using the interface 814. Firmware or software running in the computer system 800 provides a terminal interface or character-based command interface so that external commands can be given to the computer system.

A switching system 816 is coupled to bus 802 and has an input interface 814 and an output interface 819 to one or more external network elements. The external network elements may include a local network 822 coupled to one or more hosts 824, or a global network such as Internet 828 having one or more servers 830. The switching system 816 switches information traffic arriving on input interface 814 to output interface 819 according to pre-determined protocols and conventions that are well known. For example, switching system 816, in cooperation with processor 804, can determine a destination of a packet of data arriving on input interface 814 and send it to the correct destination using output interface 819. The destinations may include host 824, server 830, other end stations, or other routing and switching devices in local network 822 or Internet 828.

The invention is related to the use of computer system 800 for the techniques described herein. According to one embodiment of the invention, the techniques described herein are provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any data storage medium that participates in providing instructions to processor 804 for execution. Such a medium may take many forms, including but not limited to non-volatile storage media and volatile storage media. Non-volatile storage media includes, for example, optical or magnetic disks, such as storage device 810. Volatile storage media includes dynamic memory, such as main memory 806.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other tangible storage medium from which a computer can read.

Various forms of computer readable storage media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Communication interface 818 also provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for the techniques described herein.

The received code may be executed by processor 804 as it is received, and/or stored in storage device 810, or other non-volatile storage for later execution. In this manner, computer system 800 may obtain application code for the techniques described herein.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus, comprising:
a first network interface that is configured to be coupled to a client computer through a first network;
one or more second network interfaces that are configured to be coupled to a content server and to a key server through one or more second networks;
wherein the first network interface and second network interface are configured to receive and forward all data communicated between the client and the content server;
a processor;
logic encoded in one or more non-transitory computer-readable media for operation on an intermediate node, and configured to perform:
establishing a secure connection from the intermediate node to the key server;
receiving session identification data for an encrypted session, between the client and the content server, during negotiation of the encrypted session between the client and the content server using an encryption protocol, and storing a copy of the session identification data;
based on intercepting an end-of-the-handshake message exchanged between the client and the content server, determining that the handshake communications resulted in successful establishing of the secure session between the client and the content server;
in response to intercepting the end-of-the-handshake message, requesting from the key server, and receiving from the key server over the secure connection, a decryption key associated with the encrypted session;
receiving an encrypted message communicated between the client and the content server in the encrypted session;
decrypting the encrypted message using the decryption key to result in decrypted data and using or storing the decrypted data in a storage unit.

2. The apparatus of claim 1, wherein the logic is further configured to cause the processor to perform compressing the decrypted data to result in creating compressed data; forwarding the compressed data across a wide area network to a trusted intermediate node.

3. The apparatus of claim 1, wherein the encryption protocol is Secure Sockets Layer (SSL).

4. The apparatus of claim 1, wherein the encryption protocol is Transport Layer Security (TLS).

5. The apparatus of claim 1, wherein the key server is co-located with the content server.

6. The apparatus of claim 1, wherein the first network and the one or more second networks each comprise different first and second local area networks respectively.

7. The apparatus of claim 1, wherein the intermediate node comprises a first trusted intermediate node configured at an edge location in a wide area network, and wherein the key server is configured in a second trusted intermediate node at a core location of the wide area network.

8. The apparatus of claim 7, wherein the second trusted intermediate node and the content server are within a single domain.

9. The apparatus of claim 1, wherein the session identification data comprises any of (a) a Secure Sockets Layer (SSL) session identifier, or (b) a source network address, a destination network address, a source port number, and a destination port number, all obtained from a transport control protocol (TCP) header of the message.

10. The apparatus of claim 1, wherein the logic configured for establishing a secure connection to the key server comprises logic configured for establishing an IPsec tunnel from the apparatus to the key server.

11. A non-transitory computer-readable storage medium storing one or more sequences of instructions, which instructions, when executed by one or more processors, cause the one or more processors to carry out the steps of:
establishing a secure connection from an intermediate node to a key server;
receiving session identification data for an encrypted session, between a client and a content server, during negotiation of the encrypted session between the client and the content server using an encryption protocol, and storing a copy of the session identification data;

based on intercepting an end-of-the-handshake message exchanged between the client and the content server, determining that the handshake communications resulted in successful establishing of the secure session between the client and the content server;

in response to intercepting the end-of-the-handshake message, requesting from the key server, and receiving from the key server over the secure connection, a decryption key associated with the encrypted session;

receiving an encrypted message communicated between the client and the content server in the encrypted session;

forwarding the encrypted message without modification to the client or the content server according to a destination address in the encrypted message;

decrypting the encrypted message using the decryption key to result in decrypted data and using or storing the decrypted data in a storage unit.

12. The non-transitory computer-readable storage medium of claim 11, further comprising instructions which, when executed, cause the one or more processors to perform:

compressing the decrypted data to result in creating compressed data;

forwarding the compressed data across a wide area network to a trusted intermediate node.

13. The non-transitory computer readable storage medium of claim 11, wherein the encryption protocol is Secure Sockets Layer (SSL).

14. The non-transitory computer readable storage medium of claim 11, wherein the encryption protocol is Transport Layer Security (TSL).

15. The non-transitory computer readable storage medium of claim 11, wherein the key server is co-located with the content server.

16. The non-transitory computer readable storage medium of claim 11, wherein the first network and the one or more second networks each comprise different first and second local area networks.

17. The non-transitory computer readable storage medium of claim 11, wherein a first trusted intermediate node is configured at an edge location in a wide area network and wherein the key server is configured in a second trusted intermediate node at a core location of the wide area network.

18. The non-transitory computer readable storage medium of claim 17, wherein the second trusted intermediate node and the content server are within a single domain.

19. The non-transitory computer readable storage medium of claim 11, wherein the session identification data comprises any of (a) a Secure Sockets Layer (SSL) session identifier, or (b) a source network address, a destination address, a source port number, and a destination port number, all obtained from a transport control protocol (TCP) header of the message.

20. The non-transitory computer readable storage medium of claim 11, wherein the logic configured for establishing a secure connection to the key server comprises logic configured for establishing an IPsec tunnel from the apparatus to the key server.

21. A computer-implemented method, comprising:

establishing a secure connection from an intermediate node to a key server;

receiving session identification data for an encrypted session between a client and a content server, during negotiation of the encrypted session between the client and the content server using an encryption protocol, and storing a copy of the session identification data;

based on intercepting an end-of-the-handshake message exchanged between the client and the content server, determining that the handshake communications resulted in successful establishing of the secure session between the client and the content server;

in response to intercepting the end-of-the-handshake message, requesting from the key server, and receiving from the key server over a secure connection, a decryption key associated with the encrypted session;

receiving an encrypted message communicated between the client and the content server in the encrypted session;

decrypting the encrypted message using the decryption key to result in decrypted data and using or storing the decrypted data in a storage unit;

wherein the method is performed by one or more computing devices.

22. The method of claim 21, further comprising:

compressing the decrypted data to result in creating compressed data;

forwarding the compressed data across a wide area network to a trusted intermediate node.

23. The method of claim 21, wherein the encryption protocol is Secure Sockets Layer (SSL).

24. The method of claim 21, wherein the encryption protocol is Transport Layer Security (TLS).

25. The method of claim 21, wherein the key server is co-located with the content server.

26. The method of claim 21, wherein the first network and the one or more second networks each compromise different first and second local area networks respectively.

27. The method of claim 21, further comprising:

configuring the intermediate node as a first trusted intermediate node at an edge location in a wide area network; and configuring the key server in a second trusted intermediate node at a core location of the wide area network.

28. The method of claim 27, wherein the second trusted intermediate node and the content server are within a single domain.

29. The method of claim 21, wherein the session identification data comprises any of (a) a Secure Sockets Layer (SSL) session identifier, or (b) a source network address, a destination network address, a source port number, and a destination port number, all obtained from a transport control protocol (TCP) header of the message.

30. The method of claim 21, further comprising:

establishing a secure connection to the key server by establishing an IPsec tunnel from the apparatus to the key server.

* * * * *